United States Patent
He

(10) Patent No.: US 10,678,378 B2
(45) Date of Patent: Jun. 9, 2020

(54) OPTICAL FINGERPRINT SENSOR

(71) Applicant: Silicon Optronics, Inc., Hsinchu (TW)

(72) Inventor: Xinping He, Hsinchu (TW)

(73) Assignee: SILICON OPTRONICS, INC., Hsinchu (TW)

( * ) Notice: Subject to any disclaimer, the term of this patent is extended or adjusted under 35 U.S.C. 154(b) by 84 days.

(21) Appl. No.: 15/883,918

(22) Filed: Jan. 30, 2018

(65) Prior Publication Data

US 2018/0329577 A1 Nov. 15, 2018

(30) Foreign Application Priority Data

May 10, 2017 (TW) .............................. 106115430 A

(51) Int. Cl.
| G06K 9/28 | (2006.01) |
| G06F 3/042 | (2006.01) |
| G06K 9/20 | (2006.01) |
| G06K 9/00 | (2006.01) |

(52) U.S. Cl.
CPC ......... *G06F 3/0421* (2013.01); *G06K 9/0004* (2013.01); *G06K 9/209* (2013.01); *G06F 2203/04103* (2013.01)

(58) Field of Classification Search
CPC .......... G06F 3/042–0428; G06F 2203/04103; G06K 9/0004; G06K 9/00006–0012; G06T 1/0007
See application file for complete search history.

(56) References Cited

U.S. PATENT DOCUMENTS

| 2016/0132712 A1* | 5/2016 | Yang | G06K 9/0002 |
| | | | 348/77 |
| 2018/0204035 A1* | 7/2018 | Kim | G06F 3/0416 |
| 2018/0270403 A1* | 9/2018 | Chung | H04N 5/2253 |
| 2018/0366593 A1* | 12/2018 | Huang | G06K 9/0004 |
| 2019/0019850 A1* | 1/2019 | Xu | G06K 9/0004 |

FOREIGN PATENT DOCUMENTS

| CN | 102254168 A | 11/2011 |
| CN | 105844212 A | 8/2016 |

* cited by examiner

*Primary Examiner* — Brian Werner
(74) *Attorney, Agent, or Firm* — Muncy, Geissler, Olds & Lowe, P.C.

(57) ABSTRACT

The invention provides an optical fingerprint sensor including: an image sensing layer having an array composed of a plurality of sensing blocks; a collimating layer disposed on the image sensing layer and having a plurality of through holes penetrating from the top surface to the bottom surface of the collimating layer; a light guiding layer disposed in the collimating layer, and a glass cover layer disposed on the light guiding layer, the top surface of the glass cover layer receiving a finger touch, wherein the image resolution of the optical fingerprint sensor is defined by the number of sensing blocks, and there are a plurality of through holes directly above each of the sensing blocks.

4 Claims, 5 Drawing Sheets

OPTICAL FINGERPRINT SENSOR

CROSS REFERENCE TO RELATED APPLICATIONS

This Application claims priority of Taiwan Patent Application No. 106115430, filed on May 10, 2017, the entirety of which is incorporated by reference herein.

BACKGROUND OF THE INVENTION

Field of the Invention

The present invention relates to an optical fingerprint sensor, and in particular to an optical fingerprint sensor that has a thin collimating layer and is easy to fabricate in a silicon wafer process.

Description of the Related Art

Fingerprint recognition systems have become quite popular in recent years. A fingerprint recognition system captures an image of a user's fingerprint and decides whether to authorize the user to access the device installed with the fingerprint identification system according to the fingerprint image. In addition to access-control security devices, fingerprint recognition systems also can be applied in a variety of mobile devices, such as mobile phones, laptops, tablets, and so on.

One common fingerprint recognition system is the capacitive fingerprint touch system. Since the capacitive fingerprint touch system cannot easily sense detailed fingerprint characteristics when the distance between the sensor and the fingerprint is long, new optical fingerprint touch systems are actively being developed to take the development of fingerprint recognition systems in another direction.

In existing optical fingerprint recognition systems, in order to prevent stray light from reflecting off the fingerprint and entering the image sensor, a collimating layer is disposed on the image sensor and a plurality of through holes are formed on the collimating layer so that only light at a nearly vertical angle can be incident on the image sensor through the through holes.

However, in order to achieve a good collimation effect, the collimating layer must have a sufficient thickness, generally about 100~200 μm. This thickness is too thick for the silicon wafer process, so it is quite difficult to make a collimating layer. Therefore, it is desirable to have an optical fingerprint recognition system with a thinner collimating layer to reduce the manufacturing difficulty of the silicon wafer process.

BRIEF SUMMARY OF THE INVENTION

A detailed description is given in the following embodiments with reference to the accompanying drawings.

To solve the above problem, the invention provides an optical fingerprint sensor, including: an image sensing layer having an array composed of a plurality of sensing blocks; and a collimating layer disposed on the image sensing layer and having a plurality of through holes penetrating from the top surface to the bottom surface of the collimating layer; a light guiding layer disposed in the collimating layer; and a glass cover layer disposed on the light guiding layer, the top surface of the glass cover layer receiving a finger touch, wherein the image resolution of the optical fingerprint sensor is defined by the number of sensing blocks, and there are a plurality of through holes directly above each of the sensing blocks.

In the optical fingerprint sensor, the sensing block is formed by a single image sensing pixel. In this structure, the signal intensity sensed by the single image sensing pixel in the sensing block corresponds to the intensity of reflected light at one sampling point of a fingerprint.

In the optical fingerprint sensor, the sensing block is formed by a plurality of image sensing pixels. In this structure, the sum of signal intensities sensed by the plurality of image sensing pixels in the sensing block corresponds to the intensity of reflected light at one sampling point of a fingerprint.

In the optical fingerprint sensor, when the thickness of the collimating layer is designed, the thickness of the collimating layer is inversely proportional to the number of through holes that are located directly above one of the sensing blocks in the vertical section of the optical fingerprint sensor.

In the optical fingerprint sensor, the collimating layer has a thickness of 5-20 μm.

According to the above embodiments, the present invention can provide an optical fingerprint sensor that has a thin collimating layer and is easy to fabricate in a silicon wafer process.

BRIEF DESCRIPTION OF THE DRAWINGS

The present invention can be more fully understood by reading the subsequent detailed description and examples with references made to the accompanying drawings, wherein:

FIG. 2A shows a cross-sectional view of the through hole of the collimating layer in a conventional optical fingerprint sensor. FIG. 2B shows a cross-sectional view of the through hole of the collimating layer in the optical fingerprint sensor of the present invention. FIG. 2C shows a superimposed view of FIG. 2A and FIG. 2B.

DETAILED DESCRIPTION OF THE INVENTION

Figure 1:
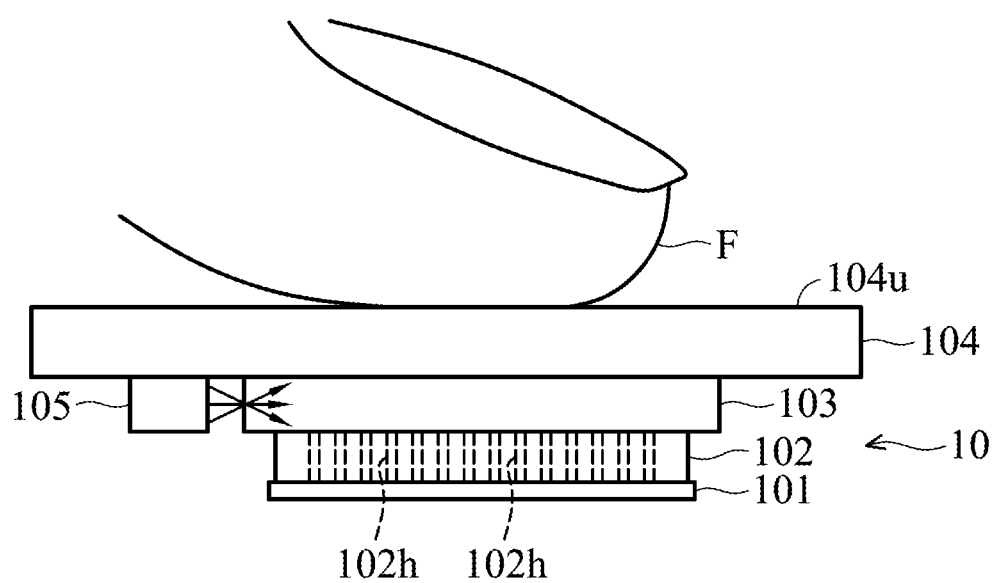
FIG. 1 is a schematic side sectional view of an optical fingerprint sensor of the present invention.

The following description is of the best-contemplated mode of carrying out the invention. This description is made for the purpose of illustrating the general principles of the invention and should not be taken in a limiting sense. The scope of the invention is best determined by reference to the appended claims.

In addition, the present invention may repeat reference numerals and/or letters in the various examples. This repetition is for the purpose of simplicity and clarity and does not in itself dictate a relationship between the various embodiments and/or configurations discussed. Furthermore, the shape, size, and thickness in the drawings may not be drawn to scale or simplified for clarity of discussion; rather, these drawings are merely intended for illustration.

FIG. 1 is a schematic side sectional view of an optical fingerprint sensor of the present invention. An optical fingerprint sensor 10 includes an image sensing layer 101, a collimating layer 102, a light guiding layer 103, a glass cover layer 104, and a light source 105. The image sensing layer 101 includes an array formed by a plurality of sensing blocks. Each sensing block may be implemented by one or more image sensing elements, such as a CCD or a CMOS. The collimating layer 102 is disposed on the image sensing layer 101 and has a plurality of vertical through holes 102h passing through from the upper surface to the lower surface of the collimating layer 102. Since the material of the collimating layer 102 is a light absorbing material, any light incident from above the collimating layer 102, if not incident downward through the through hole 102h in a nearly vertical direction, encounters the upper surface of the collimating layer 102 or the through hole wall and is absorbed. Therefore, the collimating layer 102 functions to prevent the stray light from entering the image sensing layer 101 and allowing only the light directly above each of the through holes 102h of the collimating layer 102 to enter the image sensing layer 101.

The light guiding layer 103 is disposed on the collimating layer 102, and the light source 105 is disposed on the side edge of the light guiding layer 103. The light guiding layer 103 guides the light of the light source 105 to travel in the horizontal direction while being emitted upward by utilizing the characteristic of total reflection. The entire light from the light source 105 is irradiated upward in a planar shape. The glass cover layer 104 is disposed on the light guiding layer 103 as a cover for protecting the entire device. An upper surface 104u of the glass cover layer 104 allows a user's finger F for touching to perform fingerprint recognition.

The basic operation principle of the above optical fingerprint sensor 10 will be described below. The light of the light source 105 is incident on the side surface of the light guiding layer 103 and the light is emitted toward the upper side of the light guiding layer 103 while being transmitted in a direction away from the light source 105 in the light guiding layer 103. The light emitted from the light guiding layer 103 passes through the glass cover layer 104 to be irradiated onto the fingerprint of the finger and then reflects back from the fingerprint of the finger and passes through the glass cover layer 104 and the light guiding layer 103 to be incident on the collimating layer 102. The light that can pass through the through hole 102h of the collimating layer 102 enters the image sensing layer 101 so that the sensing block located directly below the through hole 102h in the image sensing layer 101 can read the intensity of the reflected light from directly above. Since the fingerprint is formed by the surface of the peak and the valley and the intensity of the light reflected from the peak and the valley is different, the image sensing layer 101 can obtain the fingerprint image by sensing the two-dimensional distribution of the light intensity detected by the array of the sensing blocks.

As described above, the collimating layer 102 is designed to allow only light incident almost directly above the through hole 102h to reach the image sensing layer 101, so as to prevent stray light from entering the image sensing layer 101 to receive wrong images. Therefore, the length of the through hole 102h (namely, the thickness of the collimating layer 102) and the size of the opening of the through hole 102h determine the angle range of the incident light that can reach the image sensor layer 102 through the through hole 102h. It should be noted that when the through hole 102h is circular, the size of the opening of the through hole 102h refers to the opening diameter of the through hole 102h. The following description assumes that the through hole 102h is circular.

Conventionally, the length of the through hole 102h and the opening diameter of the through hole 102h are designed according to the distance from the upper surface of the collimating layer 102 to the fingerprint and the desired image resolution of the fingerprint. In general, the ratio of the length of the through hole 102h to the opening diameter of the through hole 102h is between 5:1 and 20:1. In the application of fingerprint sensing, the side length of the image sensing element (i.e., the pixel) is about 50 μm. In the better case, the side length of the image sensing element is about 25 μm, so that a finer fingerprint image can be captured. It is assumed that the opening diameter of the through hole 102h of the collimating layer 102 is approximately 20 μm which is approximately the same as the side length of the image sensing element. From the above ratio of 5:1 and 20:1, it can be seen that the length of the through hole 102h (or the thickness of the collimated layer 102) is as high as 100 to 400 μm. This thickness, for a silicon wafer fab, requires a deep etch of the wafer to make the through hole 102h, which is rather hard to fabricate and can lead to lower yields.

Figure 2A:
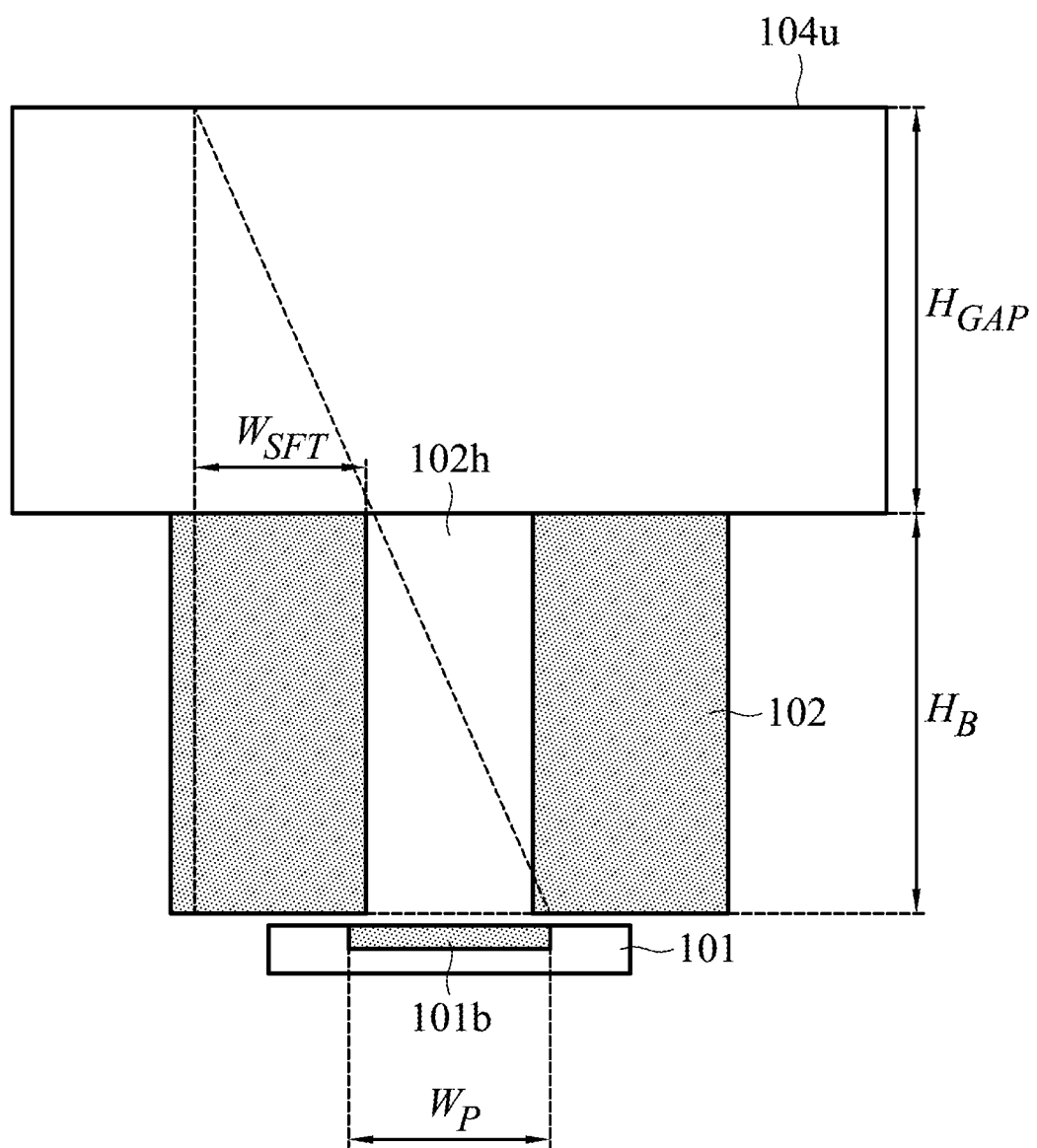
FIGS. 2A-2C are conceptual diagrams for explaining the design of the collimating layer in the optical fingerprint sensor of the present invention.
Figure 2B:
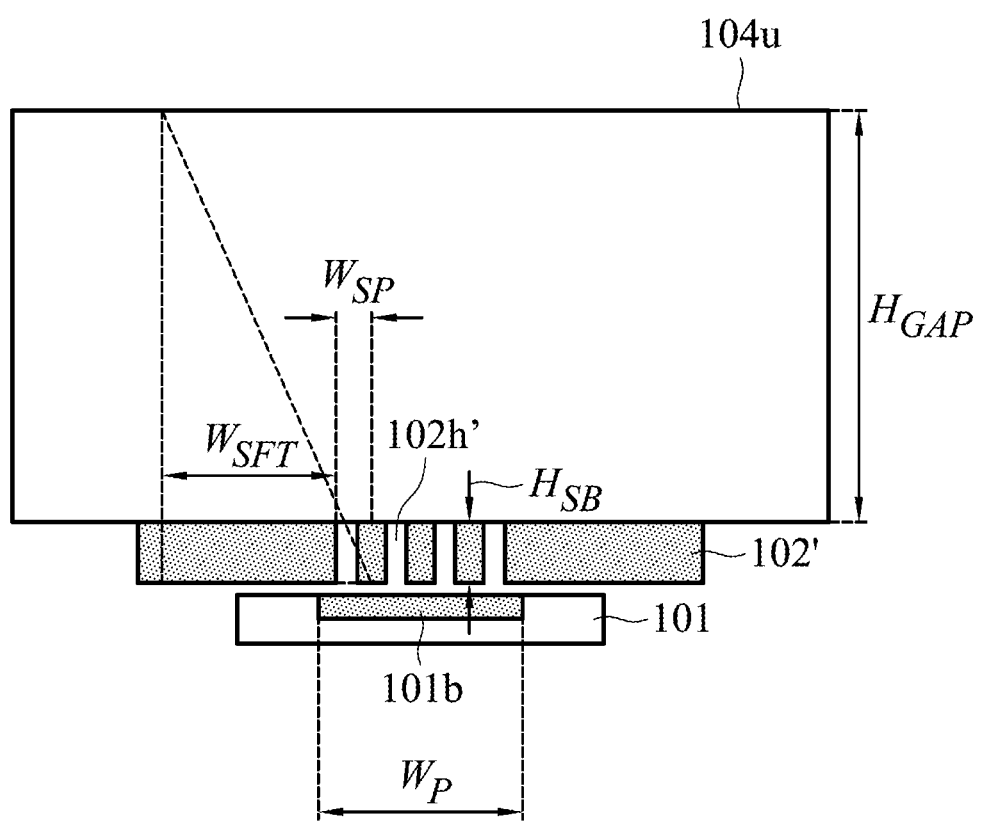
Figure 2C:
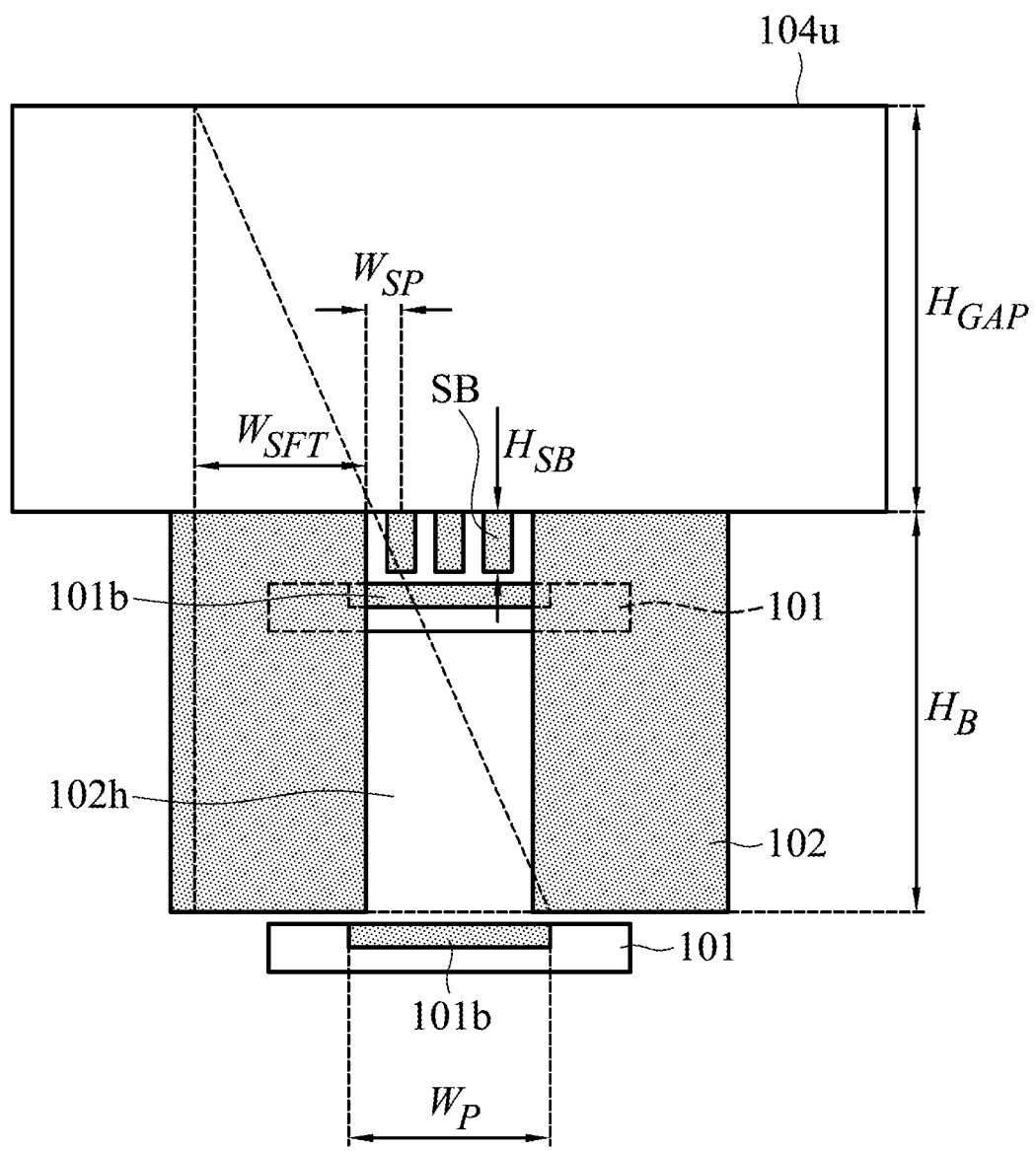

FIGS. 2A-2C are conceptual diagrams for explaining the design of the collimating layer in the optical fingerprint sensor of the present invention. FIG. 2A shows a cross-sectional view of the through hole of the collimating layer in a conventional optical fingerprint sensor. FIG. 2B shows a cross-sectional view of the through hole of the collimating layer in the optical fingerprint sensor of the present invention. FIG. 2C shows a superimposed view of FIG. 2A and FIG. 2B. In FIGS. 2A-2C, only the geometric relationship of one through hole 102h with the surrounding elements is drawn. As shown in FIG. 2A, the sensing block 101b in the image sensing layer 101 is the smallest effective sensing unit used to generate a resolution point in the fingerprint image. Therefore, the image resolution of the optical fingerprint sensor is determined by the number of sensing blocks 101b. In the conventional optical fingerprint sensor shown in FIG. 2A, a through hole 102h is disposed above each sensing block 101b. Therefore, in the conventional optical fingerprint sensor, the number of resolution points of the optical fingerprint sensor corresponds to the number of through holes 102h.

The following defines the size of each component. When the lower surface of the collimating layer 102 is sufficiently close to the upper surface of the image sensing layer 101, the length of the sensing blocks 101b is almost the same as the diameter of the opening of the through hole 102h. Therefore, in the following, for convenience of understanding, both the side length of the sensing block 101b and the opening diameter of the through hole 102h are indicated by the same size. In the conventional optical fingerprint sensor shown in FIG. 2A, assuming that the side length of the sensing block 101b is $W_P$, the thickness of the collimating layer 102 (the length of the through hole 102h) is $H_B$, the longest distance between the fingerprint and the edge of the sensing block 101b in the horizontal direction which can be sensed by the sensing block 101b is $W_{SFT}$, and the vertical distance from the upper surface of the collimating layer 102 to the fingerprint is $H_{GAP}$. According to the conventional optical fingerprint sensor, as shown in FIG. 2A, the thickness $H_B$ of the collimating layer 102 (the length of the via hole 102h) can be obtained from the following equation (1) according to the proportionality of the similar triangles.

$$H_B = (W_P/W_{SFT}) \times H_{GAP} \qquad (1)$$

Next, in the optical fingerprint sensor of the present invention shown in FIG. 2B, the collimating layer 102' has a short thickness. While maintaining the same conditions of the side length $W_P$ of the sensing block 101b, the longest distance $W_{SFT}$ between the fingerprint and the edge of the sensing block 101b in the horizontal direction which can be sensed by the sensing block 101b, and the vertical distance $H_{GAP}$ from the upper surface of the collimating layer 102' to the fingerprint, the thickness of the collimating layer 102 is reduced from $H_B$ to $H_{SB}$. In order to maintain the same proportionality of similar triangles, the present invention disposes a plurality of through holes 102h' with a smaller opening diameter directly above a sensing block 101b. As shown in FIG. 2B, there are four through holes 102h' directly above one sensing block 101b. The side length $W_P$ of the sensing block 101b is divided into four segments, and the length of each segment is $W_{SP}$. In the optical fingerprint sensor of the present invention, as shown in FIG. 2B, the thickness $H_{SB}$ of the collimating layer 102' (the length of the through hole 102h') can also be obtained from the following equation (2) according to the proportional relationship of similar triangles.

$$H_{SB}=(W_P/W_{SFT})\times H_{GAP} \qquad (2)$$

In addition, assuming that the side length $W_P$ of the sensing block 101b is divided into N segments, the length $W_{SP}$ of each segment will be equal to $W_P/N$. After $W_{SP}$ of the equation (2) is substituted by $W_P/N$ and the equation (2) is divided by the equation (1), the following equation (3) is obtained.

$$H_{SB}=(H_B/N) \qquad (3)$$

Therefore, in the present invention, the thickness $H_{SB}$ of the collimating layer 102 will be inversely proportional to the number of through holes 102h' immediately above the sensing block 101b (that is, the side length of the sensing block 101b is divided into a plurality of segments). That is, as shown in FIG. 2C, when there are four through holes 102h' directly above the sensing block 101b, the thickness $H_{SB}$ of the collimating layer 102' in the optical fingerprint sensor of the present invention is equivalent to ¼ of the thickness $H_B$ of the collimating layer 102 in the conventional optical fingerprint sensor. Therefore, for example, the thickness of the collimating layer 102 in the conventional optical fingerprint sensor is 100 μm is reduced to 25 μm in this embodiment. In addition, in some embodiments, the side length of the sensing block 101b may be divided into 10 segments, that is, ten through holes 102h' are disposed directly above one sensing block 101b. As a result, the thickness of the collimating layer 102' can be reduced to 1/10 of the conventional one. In the present invention, the thickness of the collimating layer preferably ranges from 5 to 20 μm.

According to the above embodiment, the thickness of the collimating layer can be substantially reduced by arranging the plurality of through holes directly above the sensing block for sensing one resolution point in a fingerprint pattern. However, the thickness of the collimating layer in the optical fingerprint sensor of the present invention is relatively easy to fabricate in the silicon wafer process, which can greatly reduce the manufacturing difficulty and increase the manufacturing yield.

Figure 3A:
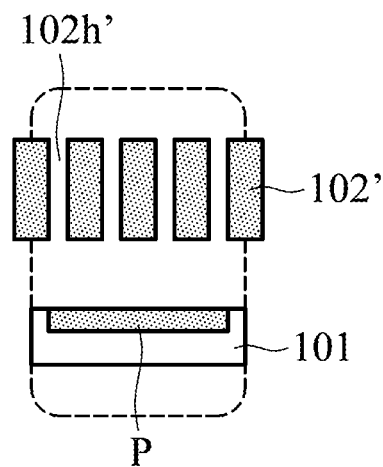
FIGS. 3A-3B show cross-sectional views of two embodiments of the sensing block of the present invention.
Figure 3B:
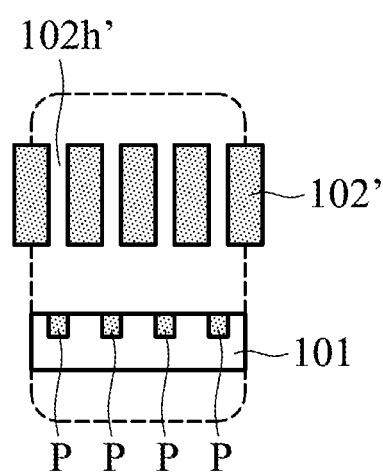

FIGS. 3A-3B show cross-sectional views of two embodiments of the sensing block of the present invention. In the above description, each sensing block 101b indicates the smallest active sensing unit that senses one resolution point in the fingerprint pattern. In one embodiment of the present invention, as shown in FIG. 3A, the sensing block 101b is formed by one image sensing pixel P, and therefore the intensity signal sensed by the image sensing pixel P corresponds to the intensity of the reflected light at one sampling point of the fingerprint. In another embodiment of the present invention, as shown in FIG. 3B, the sensing block 101b is formed by a plurality of image sensing pixels P. Therefore, the sum of the intensity signals sensed by the plurality of image sensing pixels P corresponds to the intensity of the reflected light at one sampling point of the fingerprint.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical fingerprint sensor, comprising
an image sensing layer having an array composed of a plurality of sensing blocks; and
a collimating layer disposed on the image sensing layer and having a plurality of through holes penetrating from the top surface to the bottom surface of the collimating layer;
wherein the image resolution of the optical fingerprint sensor is defined by the number of sensing blocks, there are a plurality of through holes directly above each of the sensing blocks, and the sensing block is formed by a plurality of image sensing pixels.

2. The optical fingerprint sensor as claimed in claim 1, wherein the sum of signal intensities sensed by the plurality of image sensing pixels in the sensing block corresponds to the intensity of reflected light at one sampling point of a fingerprint.

3. The optical fingerprint sensor as claimed in claim 1, wherein when the thickness of the collimating layer is designed, the thickness of the collimating layer is inversely proportional to the number of through holes that are located directly above one of the sensing blocks in the vertical section of the optical fingerprint sensor.

4. The optical fingerprint sensor as claimed in claim 1, wherein the collimating layer has a thickness of 5-20 μm.

* * * * *